United States Patent
Souli et al.

(10) Patent No.: US 9,155,316 B2
(45) Date of Patent: Oct. 13, 2015

(54) METHOD AND APPARATUS FOR HARVESTING THIGH MEAT AND OYSTER MEAT FROM A POULTRY THIGH

(71) Applicant: Meyn Food Processing Technology B.V., Oostzaan (NL)

(72) Inventors: Ramzi Souli, Oostzaan (NL); Martinus Casper Melchior Balthasar Waasdijk, Oostzaan (NL); Eric Adriaan Van Hillo, Oostzaan (NL)

(73) Assignee: MEYN FOOD PROCESSING TECHNOLOGY B.V., Oostzaan (NL)

( * ) Notice: Subject to any disclaimer, the term of this patent is extended or adjusted under 35 U.S.C. 154(b) by 0 days.

(21) Appl. No.: 14/575,388

(22) Filed: Dec. 18, 2014

(65) Prior Publication Data
US 2015/0173377 A1 Jun. 25, 2015

(30) Foreign Application Priority Data

Dec. 20, 2013 (NL) ..................................... 2012007

(51) Int. Cl.
*A22C 21/00* (2006.01)

(52) U.S. Cl.
CPC ......... *A22C 21/0076* (2013.01); *A22C 21/0046* (2013.01)

(58) Field of Classification Search
CPC .. A22C 17/00; A22C 17/004; A22C 17/0093; A22C 17/02; A22C 21/00; A22C 21/0023; A22C 21/0069; A22C 17/0076; A22C 17/0084

USPC ............. 452/52, 53, 106, 107, 150, 135, 136, 452/138, 149–153, 166, 167, 169, 170, 177, 452/180

See application file for complete search history.

(56) References Cited

U.S. PATENT DOCUMENTS

| | | | | |
|---|---|---|---|---|
| 4,993,113 A * | 2/1991 | Hazenbroek | ................. | 452/136 |
| 5,067,927 A | 11/1991 | Hazenbroek et al. | | |
| 5,462,477 A * | 10/1995 | Ketels | ............ | 452/135 |
| 5,713,787 A * | 2/1998 | Schoenmakers et al. | ...... | 452/136 |
| 5,813,908 A * | 9/1998 | Craaikamp | ................... | 452/136 |
| 5,961,383 A * | 10/1999 | Janssen et al. | ................. | 452/135 |
| 6,027,404 A * | 2/2000 | Wols | .............. | 452/138 |
| 7,008,313 B2 * | 3/2006 | Gagliardi, Jr. | ................ | 452/135 |
| 8,535,123 B2 * | 9/2013 | Van Der Stouw et al. | ..... | 452/135 |
| 8,961,274 B1 * | 2/2015 | den Boer et al. | .............. | 452/148 |

FOREIGN PATENT DOCUMENTS

| | | |
|---|---|---|
| WO | WO 03/039262 | 5/2003 |
| WO | WO 2007/055571 | 5/2007 |

OTHER PUBLICATIONS

Search report for NL 2012007, dated Aug. 3, 2014.

* cited by examiner

*Primary Examiner* — Richard Price, Jr.
(74) *Attorney, Agent, or Firm* — Dority & Manning, P.A.

(57) ABSTRACT

A method and apparatus are provided for harvesting thigh meat and oyster meat from a poultry thigh that includes a thigh bone with a hip knuckle and a knee knuckle. The poultry thigh is held at a knuckle, after which meat present on the thighbone below the knuckle is scraped from the thighbone away from the knuckle. The meat is subsequently separated from the thighbone and collected for further handling. The poultry thigh is suspended from the hip knuckle and the oyster meat is disconnected from the hip knuckle prior to scraping the meat from the thighbone away from the hip knuckle.

18 Claims, 10 Drawing Sheets

A Loading
B Positioning + Oyster cut
C Deskinning
D Scraping
E Separating
F Collecting

METHOD AND APPARATUS FOR HARVESTING THIGH MEAT AND OYSTER MEAT FROM A POULTRY THIGH

PRIORITY STATEMENT

The present application claims priority under 35 U.S.C. §119 to Dutch Application No. 2012007, filed Dec. 20, 2013.

FIELD OF THE INVENTION

The subject matter of the present disclosure relates generally to a method and apparatus for harvesting thigh meat and oyster meat from a poultry thigh.

BACKGROUND OF THE INVENTION

Oyster meat from poultry is also known as *musculus iliotro-chantericus caudalis*.

EP-A-1 639 898; U.S. Pat. Nos. 7,195,554; and 7,344,436 each disclose methods and apparatus for separating thigh meat and oyster meat from the thighbone in which the thighbone is clamped at the knee joint so that the thighbone can be swung to be tilted forward while transferred. A sinew that connects the oyster meat to the cartilage at the end of the thighbone is introduced into a narrow slot, at which the sinew is cut to separate the oyster meat and the thigh meat from the cartilage so that it may fall down. This known method and apparatus is inaccurate in that it relies on an particular tilting of the thighbone in order to arrange for the sinew to be received into the narrow slot.

WO2012/102609 relates to a method of mechanically deboning animal thighs for separating and collecting meat therefrom and an apparatus for performing this method. The thighbone of the animal is held at a hip knuckle with a bone holder, and the thighbone is engaged adjacent the bone holder with a meat stripper. A problem of this known apparatus and method is that it does not secure the harvesting of the oyster meat. In practice the position of the oyster meat is undetermined which results in that occasionally the oyster meat is lost.

U.S. Pat. No. 5,067,927 discloses a method and an apparatus for harvesting thigh meat from a poultry thigh that includes a thigh bone with a hip (implicit) knuckle and a knee (implicit) knuckle, wherein the poultry thigh is held at an upper knuckle, after which meat present on the thighbone below the upper knuckle is scraped from the thighbone away from the up-per knuckle. The meat is subsequently separated from the thighbone and collected for further handling. The document is silent on harvesting of oyster meat from the thighbone. The document further specifies that the upper knuckle is supported by a bone receiving yoke. The document further discloses that prior to scraping, cutting blades cut in the areas of the meat and muscles of the poultry thigh just below the upper knuckle of the thighbone. Considering the shape of the thighbone depicted in FIGS. 5-10 of U.S. Pat. No. 5,067,927 (narrow at the knuckle and progressively increasing in diameter farther away from the knuckle), it appears that the upper knuckle is the knee knuckle of the poultry thigh which is also consistent with the normal way in which poultry is suspended.

SUMMARY OF THE INVENTION

The present invention relates to a method and an apparatus for harvesting thigh meat and oyster meat from a poultry thigh that has a thigh bone with a hip knuckle and a knee knuckle. The poultry thigh is held at the knuckle. The meat present on the thighbone below the knuckle is scraped from the thighbone away from the knuckle. The meat is subsequently separated from the thighbone and collected for further handling. Additional aspects and advantages of the invention will be set forth in part in the following description, or may be obvious from the description, or may be learned through practice of the invention.

It is an object of the invention to provide an alternative method and apparatus for harvesting thigh meat and oyster meat from a thighbone, in which the harvesting of the oyster meat is secured and the yield of meat is improved.

It is a further object of the invention to provide a method and apparatus for harvesting thigh meat and oyster meat from a thighbone, when it is disconnected from the lower part of the bone that includes the ankle joint.

To this end a method and apparatus are proposed in accordance with one or more of the appended claims.

In a first exemplary aspect of the invention the poultry thigh is suspended from the hip knuckle and the oyster meat is disconnected from the hip knuckle prior to scraping the meat from the thighbone away from the hip knuckle. With this preparatory measure it is possible to secure the harvesting of the oyster meat.

Preferably the oyster meat is disconnected from the hip knuckle while maintaining its connection with the thigh meat on the thighbone. This ensures that when the meat of the thighbone is harvested, it will include the oyster meat that is connected thereto.

In one exemplary embodiment of the invention, scraping the meat from the thighbone is continued until reaching the knee knuckle, wherein the knee knuckle is supported by a liftable table. The liftable table ensures that the thighbone is reliably positioned making the scraping action effective for optimal yield of meat.

In one exemplary aspect, subsequent to scraping the meat from the thighbone away from the hip knuckle, the thigh meat and the oyster meat are preferably separated from the thighbone and collected for further handling.

Advantageously separating the thigh meat and the oyster meat from the thighbone is executed by cutting with a rotating circular knife having a central portion in which the thighbone is received. In this manner the thighbone itself is locked into position ensuring that the method of the invention can be executed with predictable results.

In another exemplary aspect, it is preferable that a cutting edge of the rotating circular knife and the liftable table onto which rests the knee knuckle approach each other until the knife eventually engages the table. This ensures a complete separation of the meat from the thighbone.

In the process of scraping the meat from the thighbone away from the hip knuckle, in one exemplary aspect, it is beneficial that the meat is pushed forward and apart, away from the thighbone, and in particular from the knee knuckle to pave the way for the knife. This increases the yield of meat that can be harvested with an exemplary method and apparatus of the invention. In this connection, in one exemplary embodiment of the invention the scraping arms are equipped with protrusions extending from the body of the scraping arms near to their scraping edges fir pushing the meat present on the thighbone forward and apart—away from the thighbone and in particular from the knee knuckle to pave the way for the knife.

Although the invention can be implemented in a singular apparatus, in another exemplary aspect it is preferable that the poultry thigh is suspended from the hip knuckle in a conveyor line embodied with a series of carriers, each carrier being arranged for suspending one poultry thigh which is correspondingly provided with further means for processing the poultry thigh suspended from the carrier.

Effective means to carry out the method of the invention are embodied in a harvesting apparatus for thigh meat and oyster meat from a poultry thigh that comprises holding means for holding the poultry thigh at a knuckle, scraping means for scraping meat present on the thighbone below the knuckle from the thighbone away from the knuckle, and separation means for disconnecting the meat from the thighbone, wherein the holding means includes a receptacle dimensioned to receive the hip knuckle and includes a knife for cutting the oyster meat loose from the hip knuckle. Preferably the knife is arranged to cut the oyster meat loose from the hip knuckle while maintaining the oyster meat's connection with the thigh meat.

In an exemplary embodiment, desirably the knife is a rotatable circular knife provided with a central portion equipped to receive the receptacle and during use the thighbone suspended therefrom.

In another exemplary embodiment, the scraping means of the harvesting apparatus are provided with pivoted scraping arms that are movable to and fro the holding means for the thigh-bone below the knife. Preferably the exemplary scraping arms are spring-loaded to enable their adjustment to the shape and dimensions of the thighbone.

The harvesting apparatus of the invention, in still another exemplary embodiment, further preferably is embodied with a liftable table for supporting the knee knuckle at least during operation of the scraping means and/or the knife. It is also preferred in this embodiment that the liftable table is spring-loaded so as to arrange that during use it automatically adjusts in height depending on the length of the thighbone suspended from the receptacle. It is intended however that the lifting table in this embodiment will, during use, lift the thigh bone at least partly to have the bone and the attaching knee-cap centered in order to accommodate effective and complete harvesting of meat from the bone, also in the vicinity of the knee-knuckle and cap and to avoid that bone-splinters or the knee-cap will be harvested together with the meat. Such a lifting table for moving the thighbone upwards during operation of the scraping means and/or the knife can also beneficially be used independent from the other features of the apparatus of the invention.

It is further beneficial that the exemplary knife is a rotatable circular knife provided with a central portion equipped to receive the knee knuckle including its kneecap, wherein the knife and the liftable table are arranged to cooperate and to engage each other for establishing a complete separation of the thigh meat and oyster meat from the thighbone. It is preferably during this exemplary operation that the lifting table will lift the thigh bone so that it may be nearly completely received into the central portion of the circular knife to promote effective separating of as much meat as possible from the bone.

The invention is particularly designed to be used in a fast-moving processing line such that the harvesting apparatus of the invention is movable in a conveyor line provided with a series of similar harvesting apparatuses, each equipped with means for harvesting thigh meat and oyster meat.

Generally speaking any and each feature of the invention as provided by the claims can beneficially be used independent from the other features provided by the claims.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention. The invention will hereinafter be further elucidated in a non-limiting example of a harvesting apparatus according to the invention which is depicted in the drawings.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Whenever in the figures the same reference numerals are applied, these numerals refer to the same parts.

DETAILED DESCRIPTION OF THE INVENTION

The present invention provides a method and apparatus for harvesting thigh meat and oyster meat from a poultry thigh. For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Figure 1:
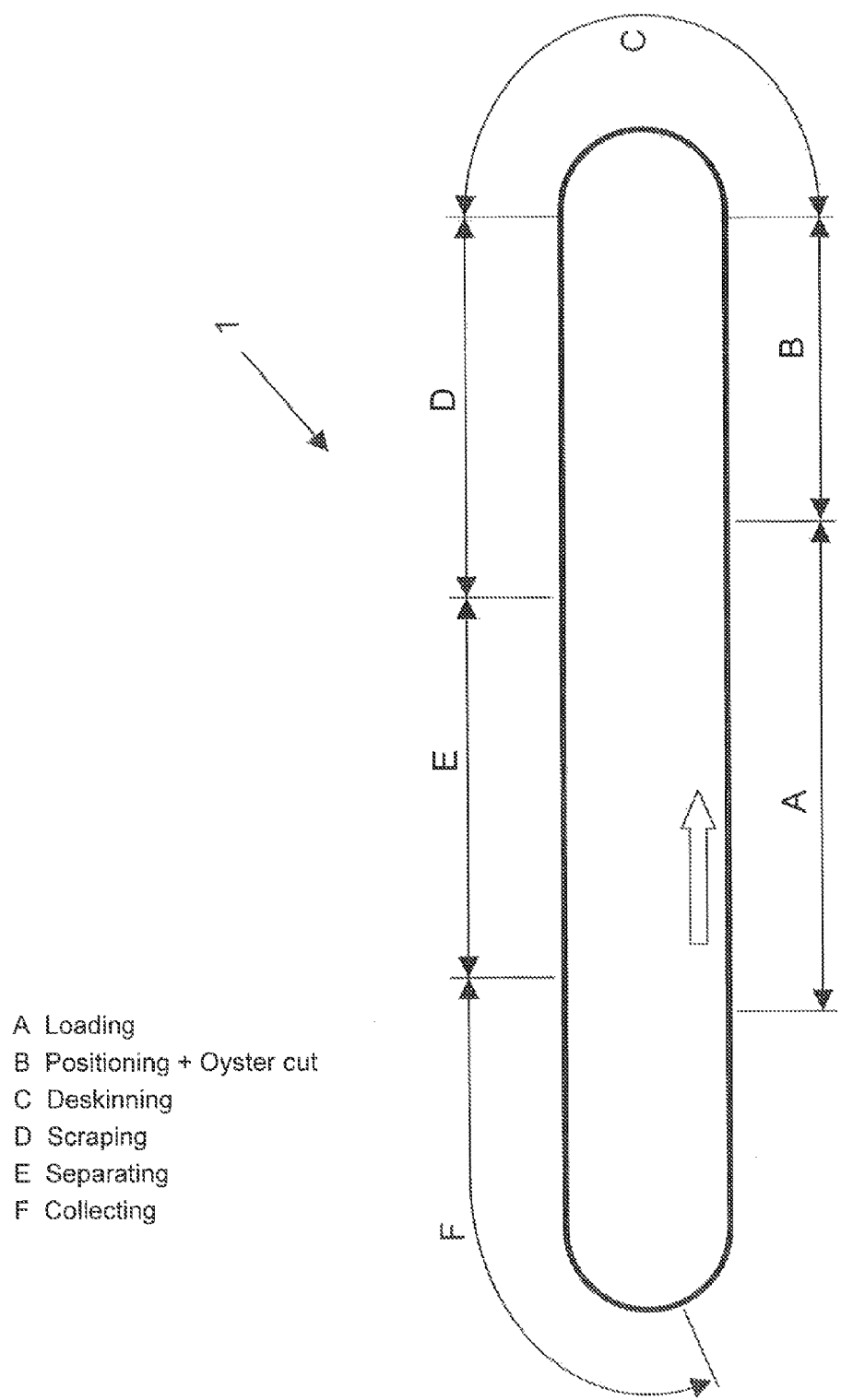
FIG. 1 schematically shows an exemplary harvesting line for thigh meat and oyster meat from poultry thighs according to an exemplary embodiment of the invention provided with several harvesting apparatuses and provided with several processing regions A-F.

With reference to FIG. 1 a harvesting line according to an exemplary embodiment of the invention is shown and depicted with reference 1. This harvesting line 1 is equipped with multiple harvesting apparatuses according to exemplary aspects of the invention, wherein at particular positions along the line predefined operations are carried out with respect to the poultry thighbone suspended in the harvesting apparatuses. These operations are preferably carried out in the following exemplary sequence: At a region A loading of the poultry thighs in the harvesting apparatuses; at a region B positioning of the poultry thighs and cutting the oyster meat loose from the hip knuckles; at a region C (optionally) deskinning of the poultry meat; at a region D scraping of the meat from the thighbones; at a region E separating the meat from the thighbones, and at a region F collecting the harvested meat fur further handling.

Figure 2:
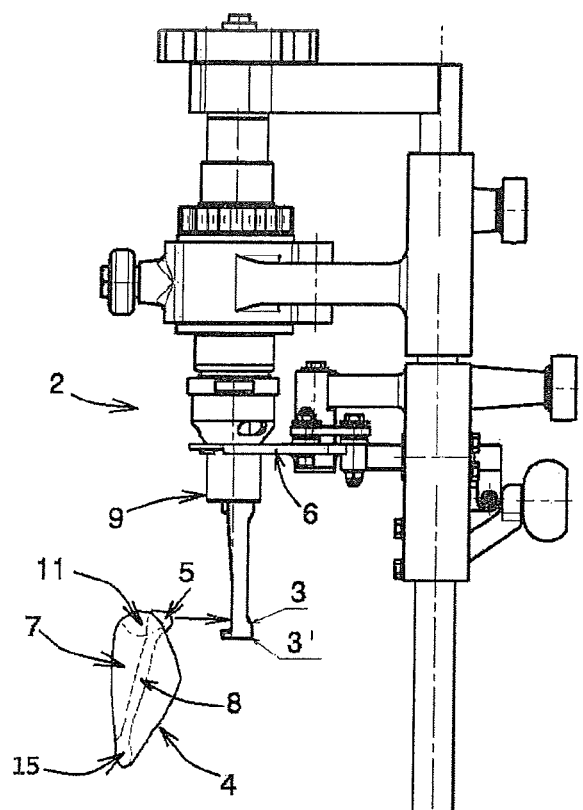
FIG. 2 shows an exemplary harvesting apparatus of the invention when it is in a region A of the harvesting line of FIG. 1.

FIG. 2 shows an exemplary, single harvesting apparatus 2 of the invention when it is in the loading region A shown in FIG. 1.

This exemplary harvesting apparatus 2 includes holding means 3 for holding a poultry thigh 4 at a knuckle, in particular the hip knuckle 5. The apparatus is further embodied with scraping means 6 (to be discussed hereinafter) for scraping meat 7 present on the thighbone 8 below the hip knuckle 5 from the thighbone 8 away from the knuckle 5. The oyster meat is depicted with reference numeral 11.

The holding means 3 for a poultry thigh is embodied with a receptacle 3' which is accurately dimensioned to receive the hip knuckle 5 of the poultry thigh.

Figure 3:
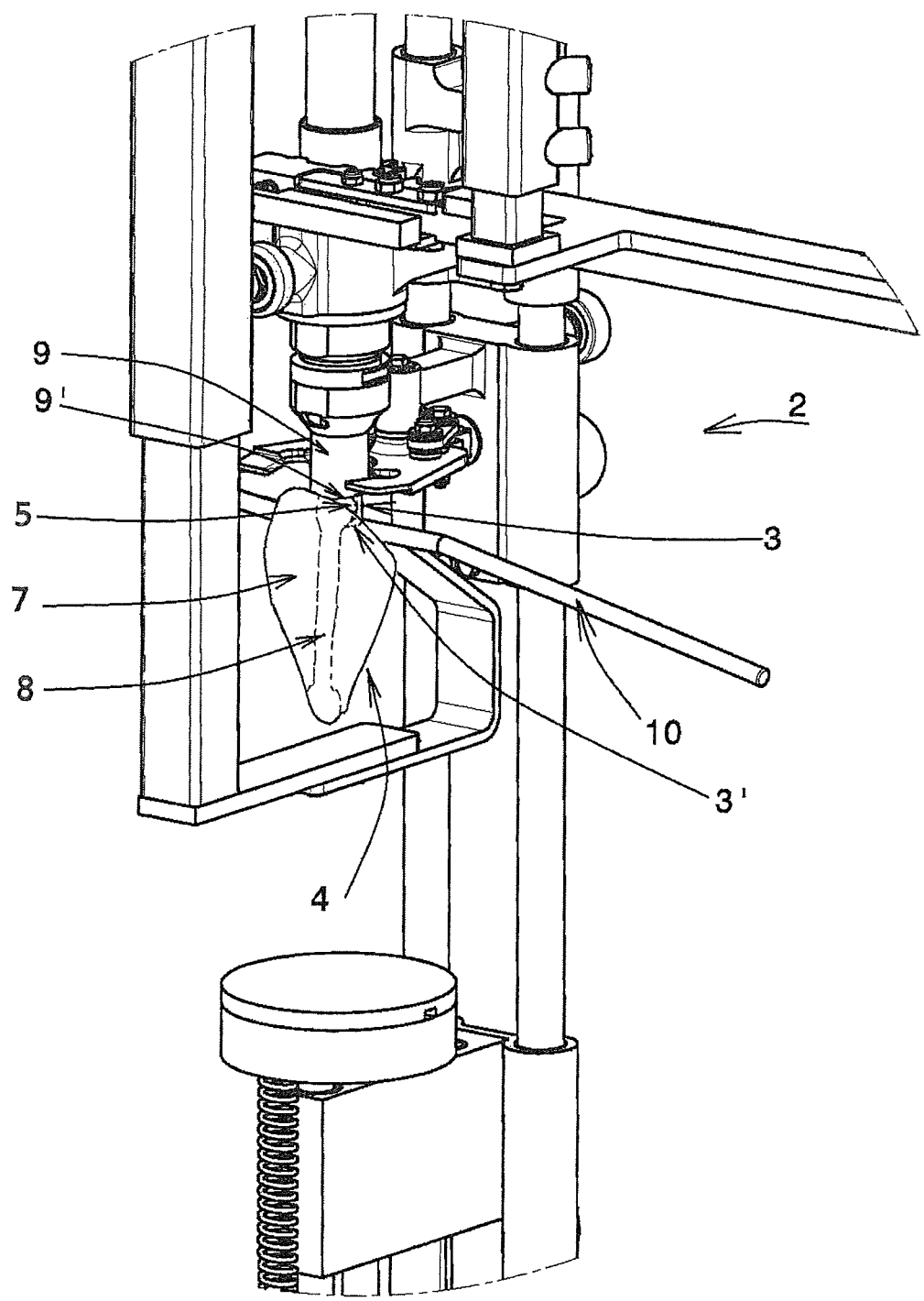
FIG. 3 shows the exemplary harvesting apparatus of the invention when it is in region B of the harvesting line of FIG. 1.

FIG. 3 shows the harvesting apparatus 2 when, after completion of the loading at region A, it has continued its path along the conveyor line and has arrived in region B shown in FIG. 1. In region B, positioning of the poultry thigh 4 is effected by guide rail 10, which operates in conjunction with the holding means 3 for the hip knuckle 5 to accurately define the position and orientation of the poultry thigh 4 as it is suspended from the receptacle 3'. In this region B, the separation means 9 of the harvesting apparatus 2 become operational. These separation means 9 are, amongst others, intended for the eventual and complete disconnection of the meat 7 from the thighbone 8 as will be discussed hereinafter. Initially, however, the separation means are used for cutting the oyster meat 11 (see FIG. 2) loose from the hip knuckle 5. In order to carry out this operation effectively and to secure the objects of the invention, the separation means 9 are embodied as a knife 9', which is arranged to cut the oyster meat 11 loose from the hip knuckle 5 while maintaining the oyster meat's connection with the thigh meat 7. It can be seen from FIG. 3 that the knife 9' is a rotatable circular knife. It is further preferable that this knife 9' has a central portion equipped to receive the receptacle 3' and during use the thighbone 8 suspended therefrom.

Figure 4:
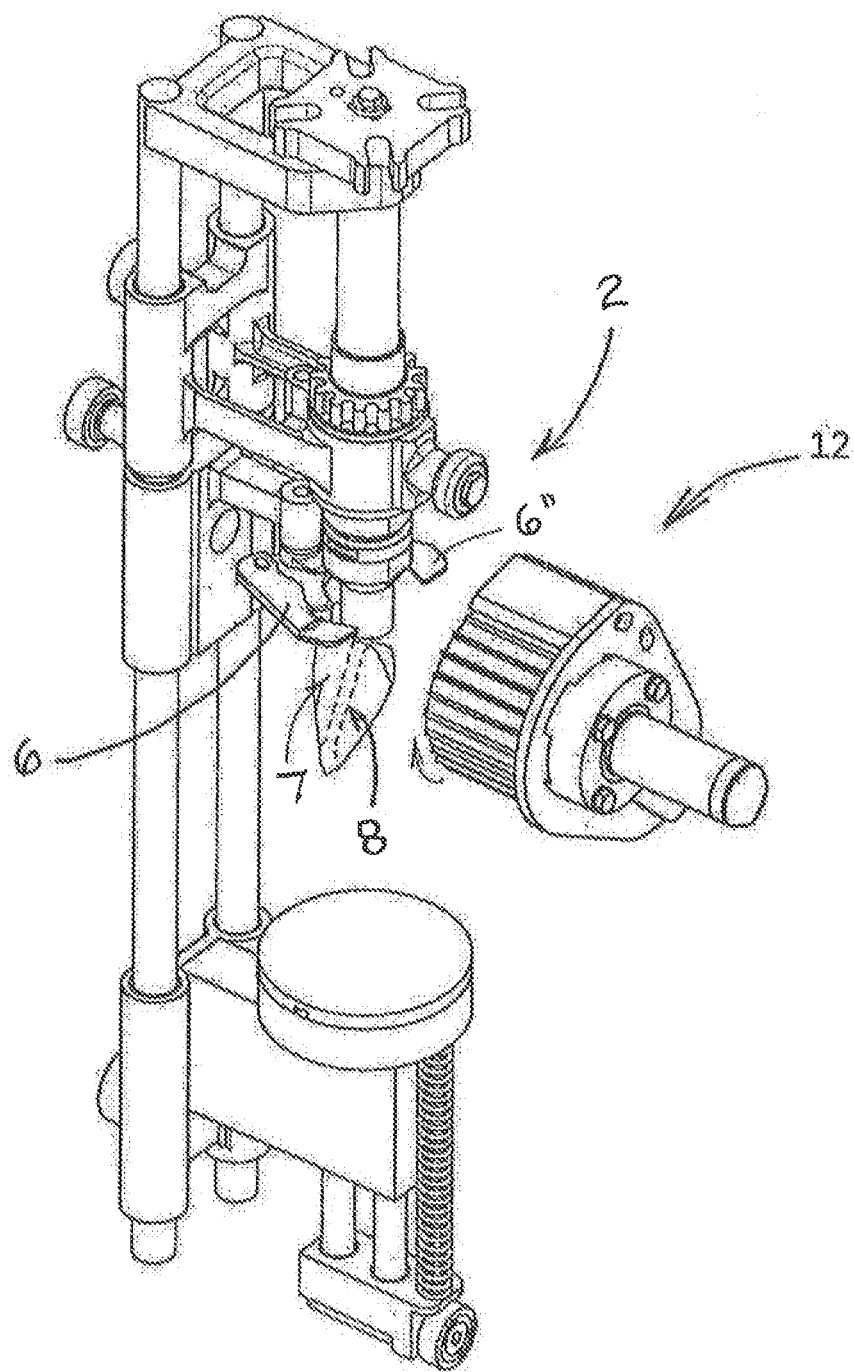
FIG. 4 shows the exemplary harvesting apparatus of the invention when it is in region C of the harvesting line of FIG. 1.

After the processing in region B, the harvesting apparatus 2 of the invention continues its path along the conveyor line, wherein it optionally may pass a deskinner 12 as shown in FIG. 4 and which is positioned in region C of the conveyor line shown in FIG. 1.

Figure 5:
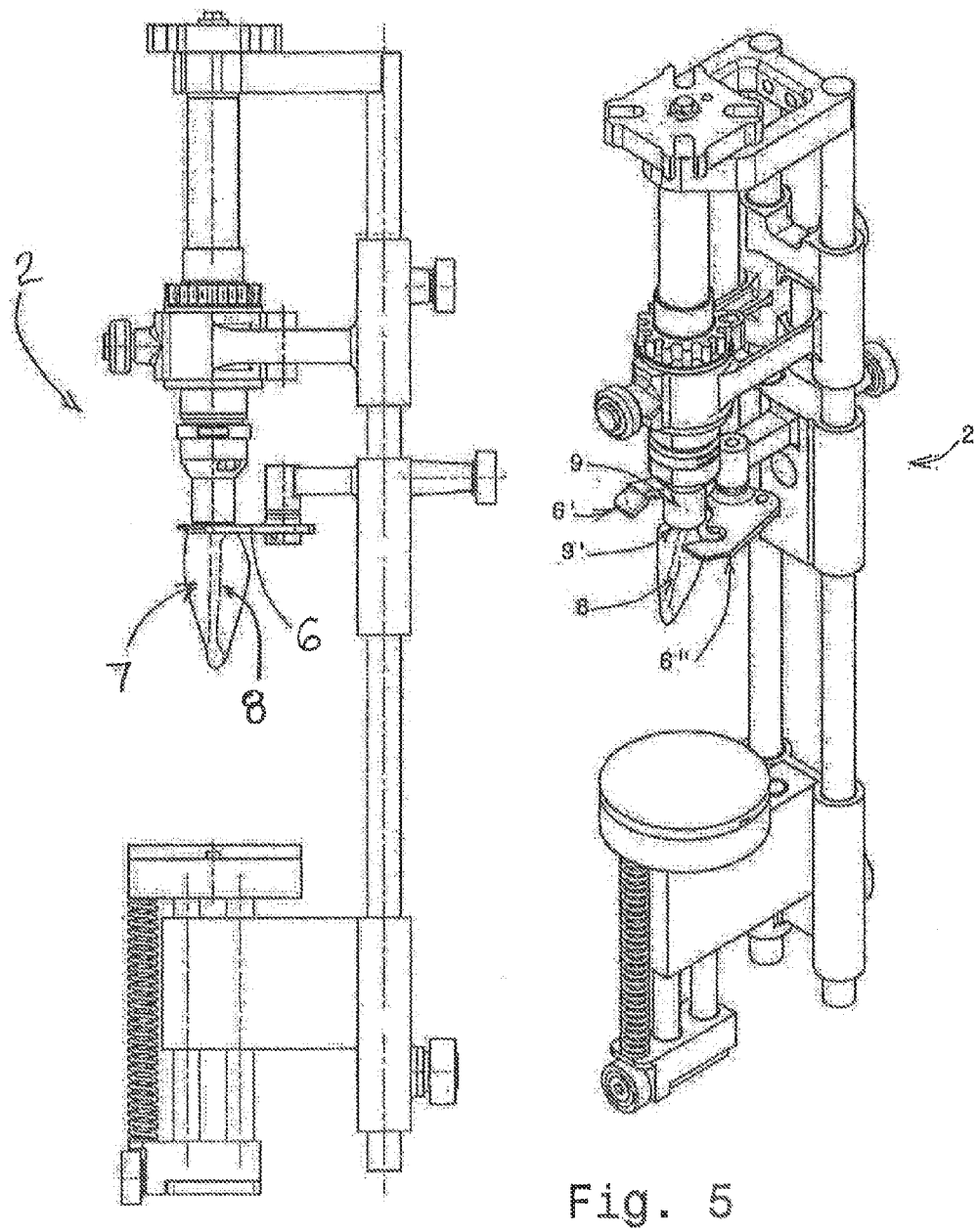
FIG. 5 shows the harvesting apparatus of the invention when it is at the start of region D of the harvesting line of FIG. 1.
Figure 6:
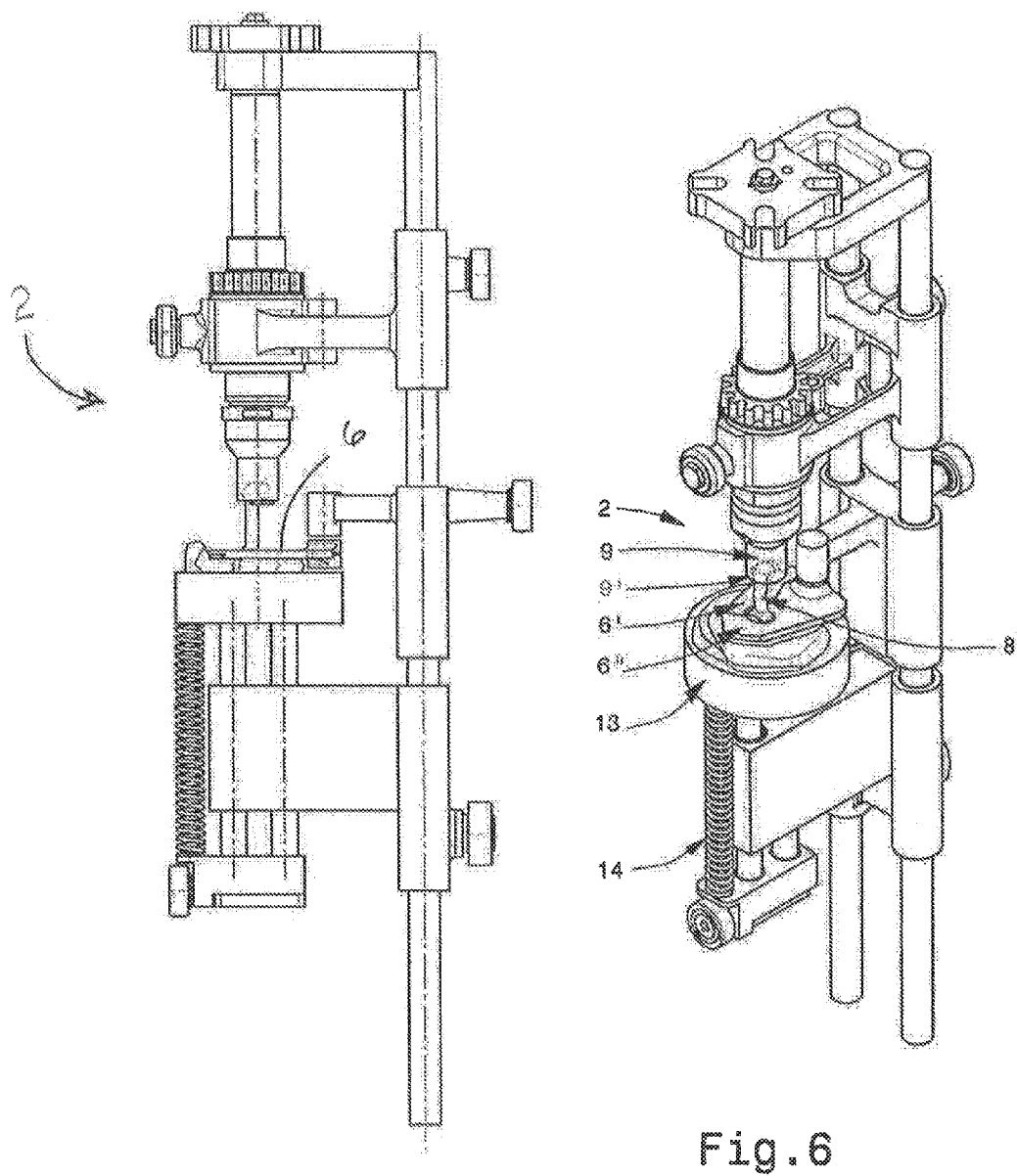
FIG. 6 shows the harvesting apparatus of the invention when it is at the end of region D of the harvesting line of FIG. 1.
Figure 7:
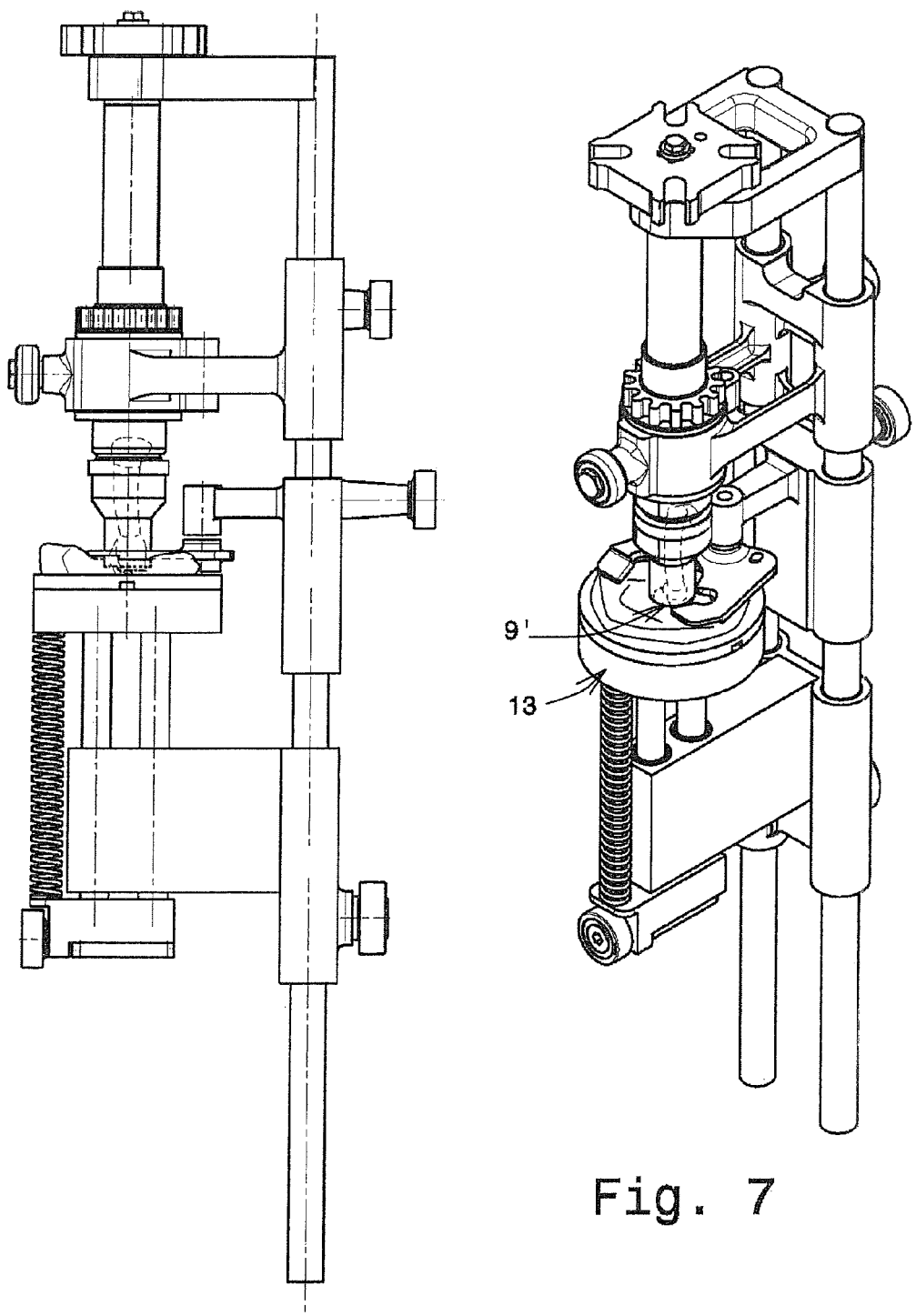
FIG. 7 shows the harvesting apparatus of the invention when it is in region E of the harvesting line of FIG. 1.

After passing region C, the harvesting apparatus 2 moves into region D, where deboning of the poultry thigh 4 is executed. FIG. 5 shows the harvesting apparatus 2 at the start of region D; FIG. 6 shows the harvesting apparatus at the end of region D. FIG. 5 shows that the exemplary harvesting apparatus 2 has scraping means 6 that are embodied with pivoted scraping arms 6', 6" that are movable to and fro the thighbone 8 below the knife 9'. FIG. 5 shows the arms 6', 6" in the open position away from holding means 3 for the thighbone; FIG. 6 shows the arms 6', 6" in the closed position close to holding means 3 for the thighbone. Preferably the scraping arms 6', 6" are spring-loaded to enable their adjustment to the shape and dimensions of the thighbone 8. The way this can be implemented is clear to the skilled person and requires no further elucidation.

After the processing with the scraping arms 6', 6" such that strip the meat 7 from the thighbone 8 has been completed at the end of region D, the harvesting apparatus 2 continues its path along the conveyor line 1 towards region E as shown in FIG. 1, at which complete separation of the meat 7 and the attaching oyster meat 11 from the thighbone 8 is effected. FIG. 6 already shows that the harvesting apparatus 2 includes a liftable table 13, which is used for supporting the knee knuckle 15 during the stripping downward movement of the scraping arms 6', 6" along the thighbone 8. The liftable table 13 is spring-loaded (see spring 14) so as to arrange that during use it automatically adjusts in height depending on the length of the thighbone 8 suspended from the receptacle 3'.

In the following region E, the liftable table 13 is also used during the final operation of the rotatable circular knife 9' for establishing a complete separation of the thigh meat 7 and oyster meat 11 from the thighbone 8. Above it is already mentioned that that this knife 9' has a central portion equipped to receive the receptacle 3' and the thighbone 8 suspended therefrom. The central portion is preferably also equipped to receive the knee knuckle 15 including its kneecap, particularly at the time when the knife 9' and the liftable table 13 cooperate to engage each other for effecting the complete separation of the meat from the thighbone.

After the operation in region E, the harvesting apparatus 2 continues its path into region F where collection of the separated oyster meat 11 and the thigh meat 7 takes place.

With reference to FIGS. 8-12 a further detailed view is offered of the operation of the harvesting apparatus of the invention during the scraping process in region D of the harvesting line, and during the meat separation in region E of the harvesting line of the invention.

Figure 8:
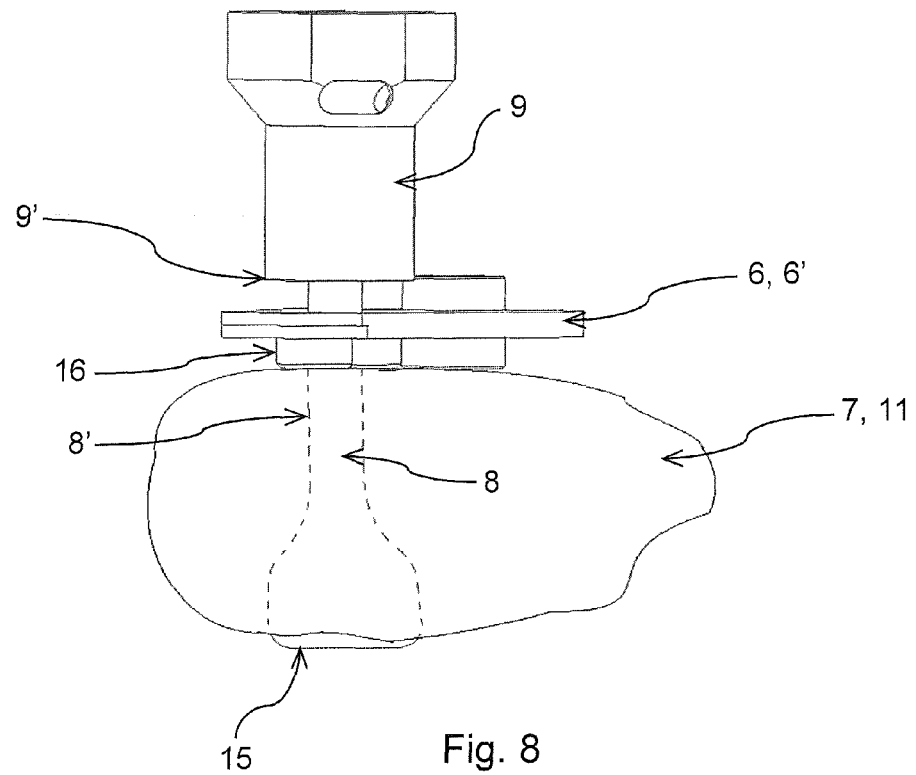
FIGS. 8 through 12 provide detailed views of the operation of the harvesting apparatus of the invention in regions D and E of the harvesting line of FIG. 1.
Figure 9:
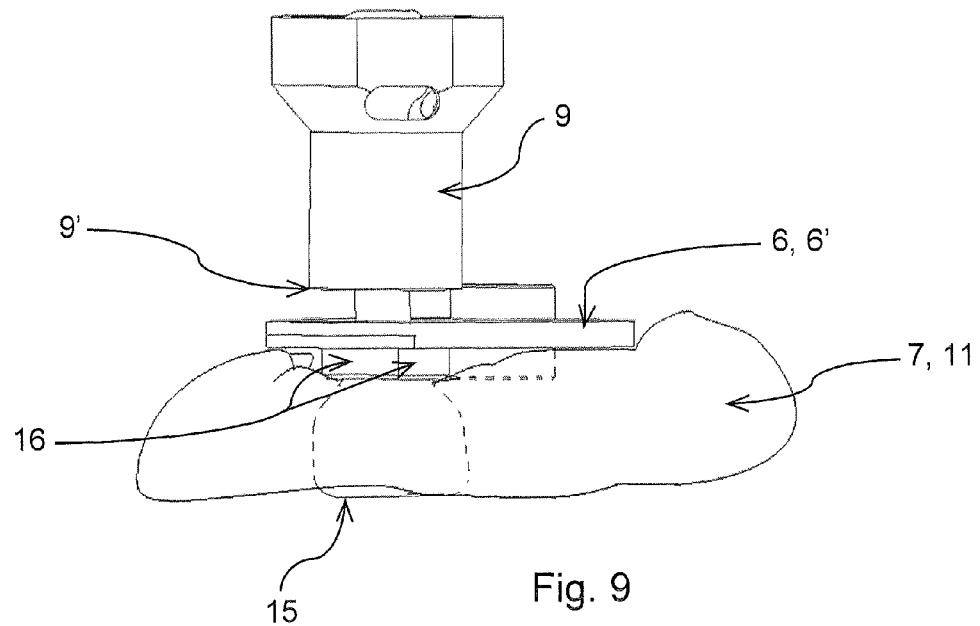
Figure 10:
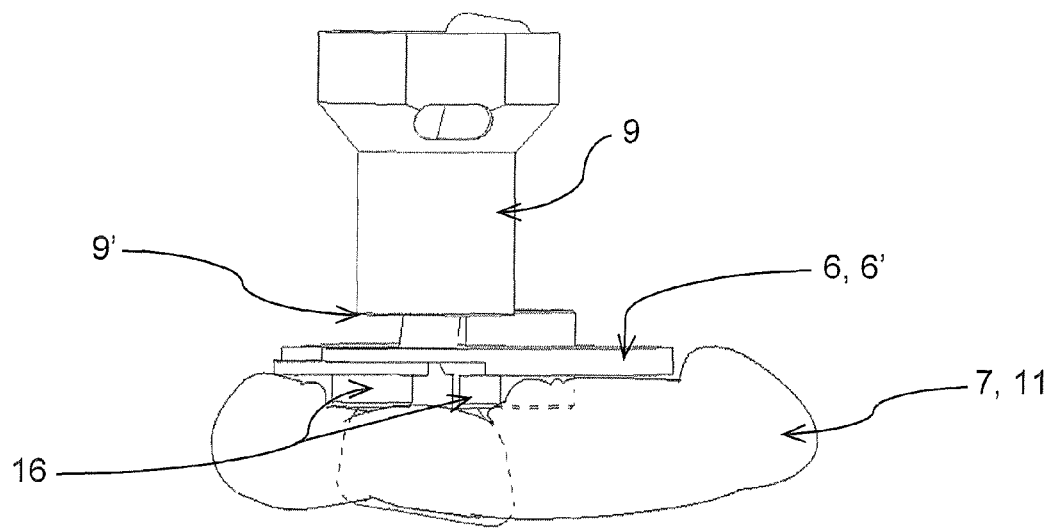
Figure 11:
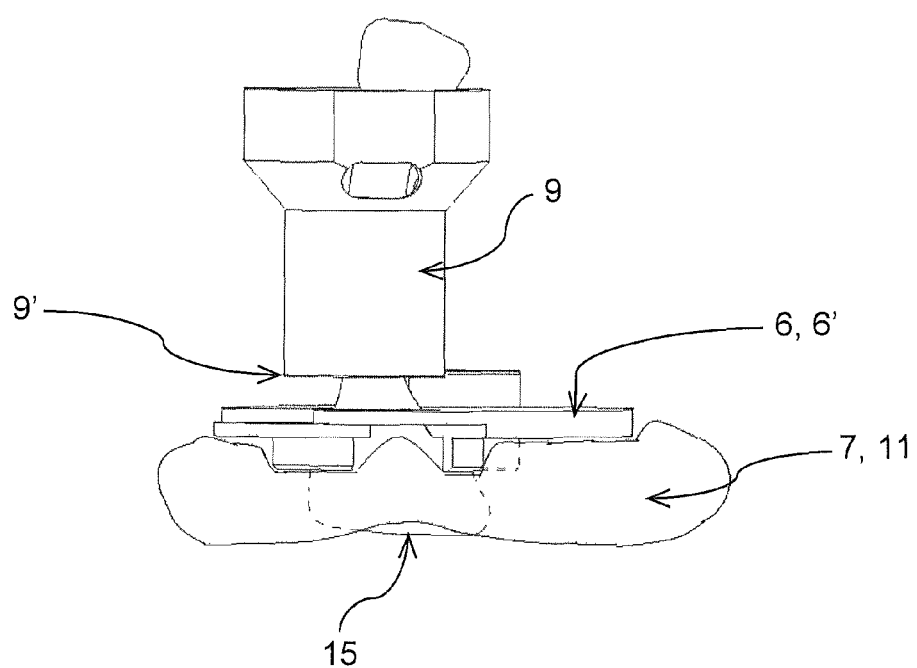
Figure 12:
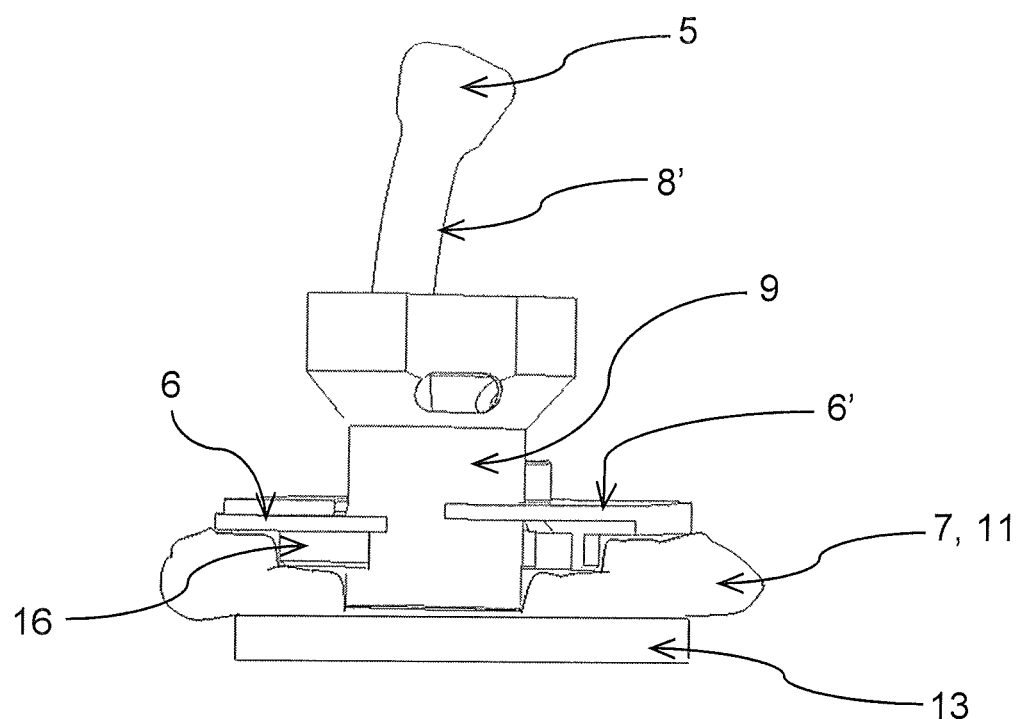

The FIGS. 8-12 depict a special exemplary embodiment of the harvesting apparatus of the invention in which the scraping arms 6', 6" are equipped with protrusions 16 extending from the body of the scraping arms 6', 6" near to their scraping edges (that are close to the bone 8' of the thighbone 8) for pushing the thigh meat 7 and oyster meat 11 forward and apart, away from the bone 8' of the thighbone 8 and in particular from the knee knuckle 15 that rests on the table 13 (see FIG. 12) to pave the way for the knife 9'. In FIG. 8 the movement of the scrapers 6, 6' is shown approximately halfway down from the hip knuckle towards the knee knuckle 15. In FIG. 9 the scrapers 6, 6' have progressed until immediately above the knee knuckle 15 which rests on the liftable table 13 (not shown, but depicted in FIG. 12). In FIG. 10 is shown that the scrapers 6, 6' are moving apart to open and enable passing along the knee knuckle 15. In this process of opening of the scrapers 6, 6' the meat 7, 11 that has been pushed forward is pushed sideways apart and away from the bone 8' of the thighbone 8. FIG. 11 shows the further downward movement of the scrapers 6, 6' along the knee knuckle 15. FIG. 12 finally shows that by pushing the meat forward and away from the bone 8' of the thighbone 8 by the operation of the protrusions 16 on the scrapers 6, 6', the way has been paved for the circular knife 9' to move forward until touching the liftable table 13, enabling it to separate the meat from the bone 8' of the thighbone 8 wherein the yield of meat 7, 11 that can be harvested is optimized.

Although the invention has been discussed in the foregoing with reference to exemplary embodiments of the apparatus of the invention and its method of operation, the invention is not restricted to these particular embodiments which can be varied in many ways without departing from the gist of the invention and the scope of the appended claims. The discussed exemplary embodiments shall therefore not be used to construe the appended claims strictly in accordance therewith. On the contrary the embodiments are merely intended to explain the wording of the appended claims without intent to limit the claims to these exemplary embodiments. The scope of protection of the invention shall therefore be construed in accordance with the appended claims only, wherein a possible ambiguity in the wording of the claims shall be resolved using these exemplary embodiments.

What is claimed is:

1. A method for harvesting thigh meat and oyster meat from a poultry thigh that includes a thigh bone with a hip knuckle and a knee knuckle, the steps comprising:
   holding the poultry thigh by suspending the poultry thigh from the hip knuckle;
   disconnecting the oyster meat from the hip knuckle;
   scraping meat present on the thighbone below the hip knuckle away from the hip knuckle after the step of disconnecting;
   separating the meat present on the thighbone below the hip knuckle from the thighbone; and
   collecting the thigh meat for further handling.

2. The method for harvesting thigh meat and oyster meat from a poultry thigh as in claim 1, wherein the oyster meat is disconnected from the hip knuckle while maintaining its connection with the thigh meat on the thighbone.

3. The method for harvesting thigh meat and oyster meat from a poultry thigh as in claim 1, wherein the step of scraping the thigh meat from the thighbone is continued until reaching the knee knuckle, wherein the knee knuckle is supported by a liftable table.

4. The method for harvesting thigh meat and oyster meat from a poultry thigh as in claim 1, wherein after the step of scraping the thigh meat and the oyster meat are separated from the thighbone by cutting with a rotating circular knife having a central portion in which the thighbone is received.

5. The method for harvesting thigh meat and oyster meat from a poultry thigh as in claim 4, wherein the cutting edge of the rotating circular knife and the liftable table onto which rests the knee knuckle approach each other until the knife eventually engages the table.

6. The method for harvesting thigh meat and oyster meat from a poultry thigh as in claim 1, wherein during the step of scraping the meat from the thighbone away from the hip knuckle, the meat is pushed forward and apart, away from the thighbone and from the knee knuckle to make way for the knife.

7. The method for harvesting thigh meat and oyster meat from a poultry thigh as in claim 1, wherein the poultry thigh is suspended from the hip knuckle in a conveyor line embodied with a series of carriers with each carrier being arranged for suspending one poultry thigh.

8. An apparatus for harvesting thigh meat and oyster meat from a poultry thigh that includes a thigh bone with a hip knuckle and a knee knuckle, the apparatus comprising
   holding means for holding the poultry thigh at a knuckle, wherein the holding means comprises
      a receptacle dimensioned to receive the hip knuckle;
      a knife for cutting the oyster meat loose from the hip knuckle;
   scraping means for scraping meat present on the thighbone below the knuckle from the thighbone away from the knuckle; and
   separation means for disconnecting the meat from the thighbone.

9. An apparatus for harvesting thigh meat and oyster meat from a poultry thigh as in claim 8, wherein the knife is arranged to cut the oyster meat loose from the hip knuckle while maintaining the oyster meat's connection with the thigh meat.

10. An apparatus for harvesting thigh meat and oyster meat from a poultry thigh as in claim 8, wherein the knife comprises a rotatable circular knife provided with a central portion equipped to receive the receptacle and during use the thighbone suspended therefrom.

11. An apparatus for harvesting thigh meat and oyster meat from a poultry thigh as in claim 8, wherein the scraping means comprises pivoted scraping arms that are movable to and fro the holding means for the thighbone below the knife.

12. An apparatus for harvesting thigh meat and oyster meat from a poultry thigh as in claim 11, wherein the scraping arms are spring-loaded to enable their adjustment to the shape and dimensions of the thighbone.

13. An apparatus for harvesting thigh meat and oyster meat from a poultry thigh as in claim 8, further comprising a liftable table for supporting the knee knuckle and moving the thighbone upwards at least during operation of the scraping means, the knife, or both.

14. An apparatus for harvesting thigh meat and oyster meat from a poultry thigh as in claim 8, wherein the liftable table is spring-loaded so as to arrange that during use it automatically adjusts in height depending on the length of the thighbone suspended from the receptacle (3').

15. An apparatus for harvesting thigh meat and oyster neat from a poultry thigh as in claim 8, wherein the knife comprises a rotatable circular knife provided with a central portion equipped to receive the knee knuckle including its kneecap, wherein the knife and the liftable table are arranged to cooperate and to engage each other for establishing a complete separation of the thigh meat and oyster meat from the thighbone.

16. An apparatus for harvesting thigh meat and oyster meat from a poultry thigh as in claim 8, wherein the scraping means comprises pivoted scraping arms that are movable to and fro the holding means for the thighbone below the knife, wherein the scraping arms are equipped with protrusions extending from a body of the scraping arms near to their scraping edges for pushing the meat present on the thighbone forward and apart, away from the thighbone and in particular from the knee knuckle so as to pave the way for the knife.

17. An apparatus for harvesting thigh meat and oyster meat from a poultry thigh as in claim 8, wherein the apparatus is movable in a conveyor line provided with a series of similar harvesting apparatuses, each equipped with means for harvesting thigh meat and oyster meat.

18. A harvesting line equipped with multiple harvesting apparatuses according claim 8.

* * * * *